United States Patent [19]
Itoh et al.

[11] Patent Number: 5,422,148
[45] Date of Patent: Jun. 6, 1995

[54] LIQUID CRYSTAL DISPLAY DEVICE

[75] Inventors: Nobuyuki Itoh, Nara; Shizuo Murata; Hideo Saito, both of Ichihara, all of Japan

[73] Assignees: Sharp Kabushiki Kaisha; Chisso Corporation, both of Osaka, Japan

[21] Appl. No.: 163,176

[22] Filed: Dec. 7, 1993

[30] Foreign Application Priority Data

Dec. 7, 1992 [JP] Japan .................. 4-326959

[51] Int. Cl.$^6$ .......................... G02F 1/1337
[52] U.S. Cl. ............................ 428/1; 359/75; 359/78
[58] Field of Search ............... 428/1; 359/75, 78

[56] References Cited

U.S. PATENT DOCUMENTS

| | | | |
|---|---|---|---|
| 3,994,567 | 11/1976 | Matsuo et al. | 428/1 |
| 4,367,924 | 1/1983 | Clark et al. | 359/75 |
| 4,720,173 | 1/1988 | Okada et al. | 359/75 |

FOREIGN PATENT DOCUMENTS

| | | |
|---|---|---|
| 0208293 | 1/1987 | European Pat. Off. |
| 2561005 | 9/1985 | France . |
| 56-107216 | 8/1981 | Japan . |
| 58-130325 | 8/1983 | Japan . |
| 60-097324 | 5/1985 | Japan . |
| 62-000917 | 1/1987 | Japan . |
| 3-287543 | 12/1991 | Japan . |

OTHER PUBLICATIONS

M. Glogarova and J. Pavel, J. Physique 45 (Jan. 1984) 143–149.
Sato, et al.: The twelfth Liquid Crystal Symposium (Nagoya), 1F16 (Jan. 1986) pp. 40–41.
T. P. Rieker, et al., "Chevron Local Layer Structure in Surface-Stabilized Ferroelectric Smectic-C Cells", Physical Review Letter, vol. 59, No. 23, pp. 2658–2661, Dec. 1987.

*Primary Examiner*—Alexander S. Thomas
*Attorney, Agent, or Firm*—David G. Conlin; Linda M. Buckley

[57] ABSTRACT

A liquid crystal display device wherein an orientation film is formed from a polyimide which is obtained by polymerization of an amine of the formula (I)

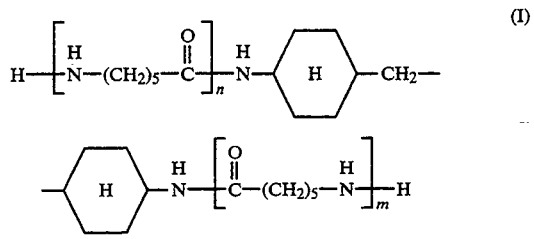

and 1,2,4,5-benzenetetracarboxylic acid dianhydride as main components and ferroelectric liquid crystals are oriented in liquid crystal cell using said orientation film.

7 Claims, 4 Drawing Sheets

LIQUID CRYSTAL DISPLAY DEVICE

BACKGROUND OF THE INVENTION

1. Field of the Invention

The present invention relates to a liquid crystal display device, and more particularly it relates to a liquid crystal display device in which ferroelectric liquid crystals are used.

2. Description of the Related Art

In the conventional liquid crystal display devices, some of them use nematic liquid crystals while others use ferroelectric ones. Examples of liquid crystal display devices using nematic liquid crystals are those of twisted nematic type (TN type) and supertwisted birefringence effect type (SBE type).

In the liquid crystal display device of TN type, there is a disadvantage with a progress of multiplexing of a driving means that driving margin becomes narrower whereby sufficient contrast is not resulted. Further, in the liquid crystal display device of SBE type with great twist angles which is an improved version of that of TN type, there is a disadvantage that, when it is used for display of large capacity, contrast lowers and response speed becomes slower.

In order to improve such disadvantages, N. A. Clark and S. T. Lagerwall proposed a liquid crystal display device using chiral smectic C liquid crystals, i.e. ferroelectric liquid crystals (cf. Japanese Laid-Open Patent Publication 56/107216 and U.S. Pat. No. 4,367,924).

Figure 6:
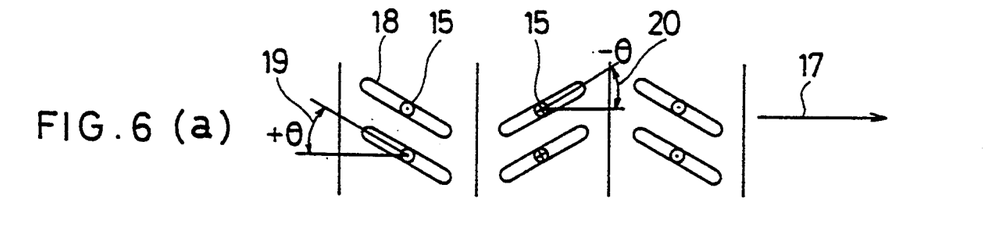

Unlike the nematic liquid crystal display devices in which rotating power generated only by polarity of electric field using dielectric anisotropy of nematic liquid crystals, the above liquid crystal display device is a ferroelectric one using rotating power generated by spontaneous polarization of ferroelectric liquid crystals and that of electric field. Characteristic features of the liquid crystal device are bistability, memory and quick response. Thus, as shown in FIG. 6, when the ferroelectric liquid crystals are injected in a cell in which the gap is made thin, helical structure of the ferroelectric liquid crystals gets loose as a result of interfacial affection and an area in which the liquid crystal molecules 18 are in a stable state with an angle of inclination of $+\theta 19$ to the normal line 17 of smectic layer and another area in which they are in a stable state with an angle of $-\theta 20$ to the opposite direction are mixed whereby a bistability is resulted. When electric field 16 is applied to the ferroelectric liquid crystals in said cell, directions of the liquid crystal molecules 18 and spontaneous polarization thereof 15 can be uniformly aligned and, upon changing the polarity of the applied electric field 16, switching of orientation of the liquid crystal molecules 18 from one state to another one is possible.

As a result of said switching driving, there is a change of light of double refraction in the ferroelectric liquid crystals in the cell and, therefore, when the cell is sandwiched between two polarizers, it is possible to control the transmitted light. Further, even when the applied electric field is canceled, orientation of the liquid crystals can be kept in a state prior to the cancel of application of field due to the controlling ability of the interface for the orientation whereby memory effect can be resulted too. In addition, the time necessary for the switching driving is as little as 1/1,000 or less of that of liquid crystal display device of twisted nematic type because of a direct action of electric field with spontaneous polarization of liquid crystals whereby quick response is possible.

Thus, construction of liquid crystal display devices with many scanning lines and high degree of resolution by a multiplex driving system have been attempted already by utilizing the memory effect and the quick response of such ferroelectric liquid crystals.

However, even in the liquid crystal display device of the type by Clark and Lagerwall, there are several problems. First, as compared with common nematic liquid crystals, the liquid crystals of chiral smectic C phase exhibiting ferroelectric property are less symmetric and higher ordered from the aspect of crystallinity. Accordingly, it is difficult to make them uniformly orientated whereby there is a disadvantage that homogeneous element is hardly prepared.

Figure 2:
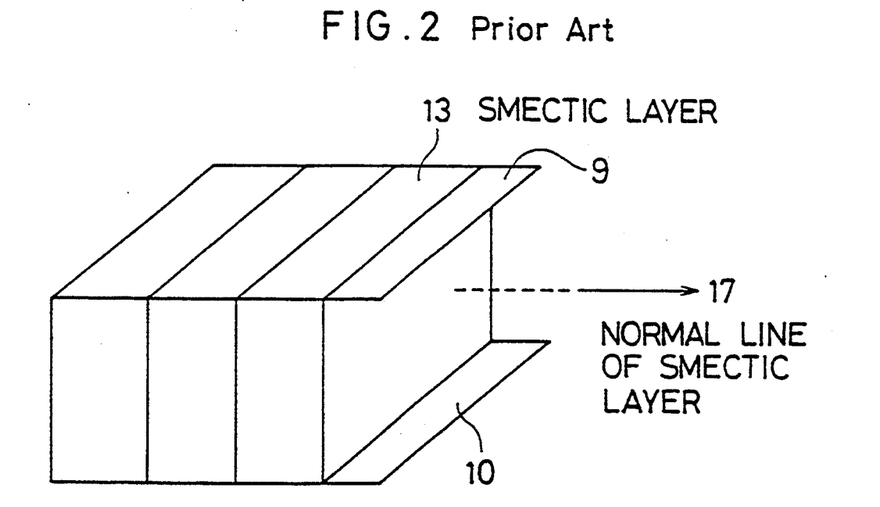
FIG. 2 is a schematic view which shows the initial layer structure model of a liquid crystal exhibiting chiral smectic C phase.

In initial model, the structure of smectic C phase layers is thought, as shown in FIG. 2, to be vertical to the substrates called a bookshelf type. In the drawing, 9 and 10 are substrates, 13 is a smectic layer and 17 is a direction of normal line of the smectic layer. When, however, cells are prepared using a conventional orientation film, there are large differences between the expected switching phenomenon as well as optical characteristics and the actual ones whereby entirely different switching has been found to take place from the proposed model.

Figure 3:
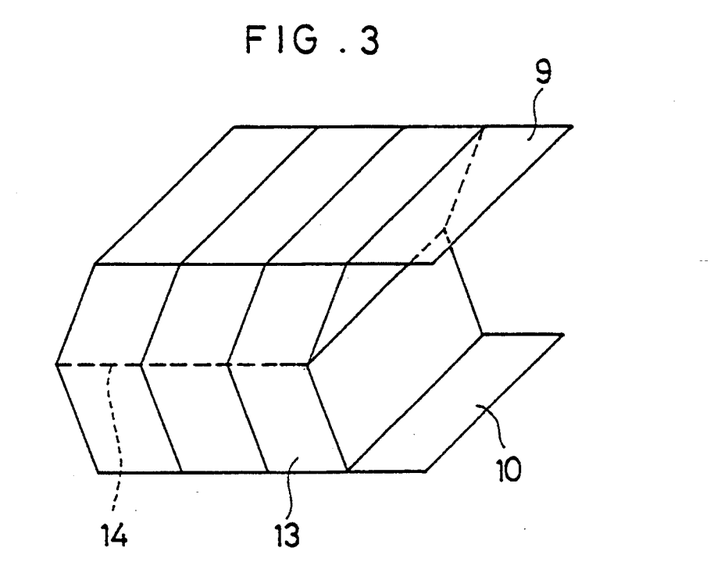
FIG. 3 is a schematic view which shows the layer structure model of a liquid crystal exhibiting chiral smectic C phase in the present invention.

One of the causes is that the layer structure is in a V-shaped bent state called chevron, as shown in FIG. 3, as a result of small angle scattering of x-ray [cf. T. P. Rieker, N. A. Clark, et al: Phys. Rev. Lett., 59, page 2658 (1987)]. In the drawing, 9 and 10 are substrates, 13 is a smectic layer and 14 is a juncture of the chevron structure. Another point which is different from the initial model is as follows. Thus, not only that the direction of spontaneous polarization and liquid crystal molecules have uniform orientations, but also that the molecules form a twisted orientation between the upper and the lower substrates [cf. M. Glogarova and J. Pavel, J. Phys. (France), 45, pages 143 (1984)].

It has been in the meanwhile found that the ferroelectric liquid crystals which are oriented especially by means of orientation film wherein a uniaxial orientation is conducted by rubbing are in a twisted orientation because of strong controlling force at the interface. It has been found that, in such orientation, difference in optical molecular axis in switching between the two states does not appear effectively in general whereby high contrast is not achieved. In order to solve such a disadvantage, there are several proposals in which the model initially proposed by Clark, et al. is achieved. As one of such proposals, there is a report that, in orientation film using a SiO rhombic chemical vapor deposition method, relatively high pretilt is given to the substrate interface whereupon bending of the layer can be prevented to achieve the obliquely inclined layer structure.

Second, there is a proposal on a method in which alternating field of high voltage is applied to a cell having a bent structure whereby the layer structure is changed to a bookshelf structure [cf. Sato, et al: The Twelfth Liquid Crystal Symposium (Nagoya), 1F16 (1986)] and the report said that high contrast characteristics were resulted in all cases. However, in the first-mentioned rhombic chemical vapor deposition method, there are large problems in terms of production that the technique for making chemical vapor deposition angle uniform is difficult and that it has a process in vacuo. In the method of applying electric field, it is difficult to change the layer structure homogeneously and, with an elapse of long time, there are many cases of returning to chevron structure. Thus, the method has not been practically used yet.

SUMMARY OF THE INVENTION

The present invention is to solve such problems and to offer liquid crystal display device having high contrast characteristics in spite of the fact that it has chevron structure.

According to the present invention, it provides a ferroelectric liquid crystal device comprising a pair of substrates each having an electrode optionally covered with a protecting or insulating film on the surface thereof to form a cell and ferroelectric liquid crystals inserted into the cell, in which both or either one of the surfaces of ferroelectric liquid crystals to be contacted with the cell are covered with an orientation film comprising a polyimide resin obtained by polymerization of an amine of the formula (I)

wherein n and m each are an integer of 0 to 2 provided that (n+m) should be an integer of 1 to 4, with 1,2,4,5-benzenetetracarboxylic dianhydride as amine components and treated with a uniaxial orientation.

DESCRIPTION OF THE DRAWINGS

FIG. 6a-d is an illustrative drawing which shows the principle of operation in the ferroelectric liquid crystal elements.

DETAILED DESCRIPTION OF PREFERRED EMBODIMENTS

In the present invention, the orientation film is formed from a specific polyimide resin. Such a polyimide resin can be prepared by polymerization wherein the amine represented by the formula (I) and 1,2,4,5-benzenetetracarboxylic acid dianhydride are main components. Examples of the amine of the formula (I) are compounds having the formulae (II), (III) and (VI).

The polymerization is usually carried out without separating amine. In other words, bis(4-aminocyclohexyl) methane and ε-caprolactame are mixed at a predetermined mole ratio, followed by reacting them with each other in a solvent at 50° to 60° C. Then 1, 2, 4, 5-benzentetracarboxylic acid dianhydride is mixed in a solution in the quantity based on the stoichiometrical quantity and then is heated to provide a polyamide acid solution. Then imide formation is carried out by applying the solvent to a substrate that constitutes a liquid crystal cell and warming the substrate to a predetermined temperature. Alternatively, small amount of auxiliary component such as 1-amino-4-trimethoxysilylbenzene is added to the above-given main components and the above procedures are conducted.

Preferable examples of the solvents as referred to hereinabove are NMP (N-methylpyrrolidone), dimethylacetamide and dimetylformamide.

The above warming is usually conducted at about 10°–80° C.

In the above polyamide acid solution, the concentration of the polyamide acid is adjusted to such an extent that the viscosity is suitable for coating procedure, e.g., in the range of 0.1 to 30% by weight.

Examples of the applicable substrates which are coated with the above polyamide acid solution are those in which electrodes are selectively formed on the surface of light-transmitting and insulating substrate such as glass or polymethyl methacrylate and an insulating film is further formed thereupon.

The conditions for the above heating are that whereby the coated polyamide acid is polymerized to convert to a polyimide resin film and, usually, the heating is conducted at about 150°–300° C. for 1 to 240 minutes.

The above-mentioned polyimide resin film can be used as an orientation film after subjecting to a uniaxial orientation treatment. The uniaxial orientation treatment is preferably conducted by a rubbing method.

In the present invention, the liquid crystal cell is formed by using a pair of substrates at least one of which has the above-mentioned orientation film formed thereon and then ferroelectric liquid crystals are oriented whereupon the liquid crystal display device is constituted.

Usually, the layer structure of the ferroelectric liquid crystals in chiral smectic C phase is in a V-shaped structure as shown in FIG. 3. The reason why the structure is as such is supposed to be that when the liquid crystal phase (smectic A phase in general) which is at the higher temperature side than chiral smectic C phase changes to chiral smectic C phase, liquid crystal molecules incline whereupon the space among layers become small and molecules near the substrate interface hardly move and the layer is bent so that the layer space in the liquid crystal phase at the high temperature side can be maintained.

Figure 4:
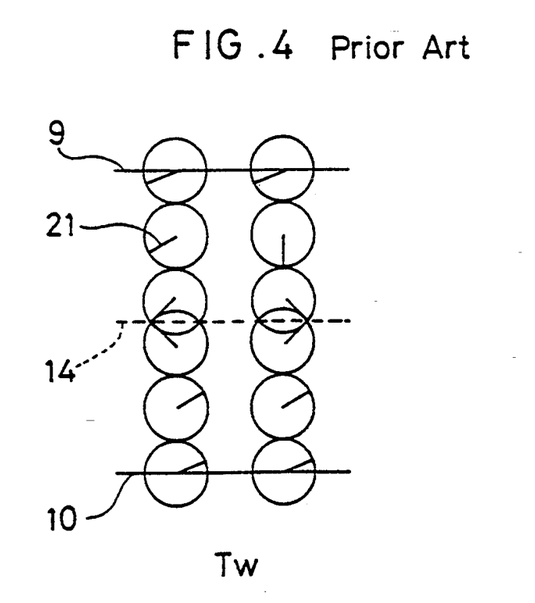
FIG. 4 is a diagrammatic view which shows the C director of a liquid crystal exhibiting chiral smectic C phase in the conventional cases.
Figure 5:
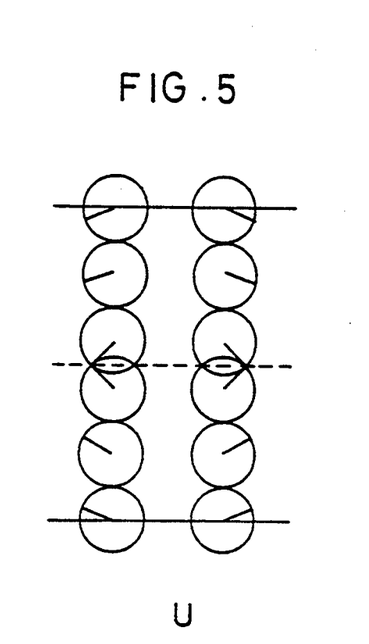
FIG. 5 is a diagrammatic view which shows the C director of a liquid crystal exhibiting chiral smectic C phase in the present invention.

Further, in terms of molecular orientation in the layer, there are two kinds of orientations—one is uniform orientation in which directions of spontaneous polarization and liquid crystal molecules are nearly aligned in the same direction while the other is twisted orientation in which the molecule is twisted between the upper and the lower substrates. The reason why such different orientations are present is thought to be due to the orientation control to the liquid crystals at the interface of the orientation film. Thus, when the orientation control is too strong, the liquid crystal molecules at the interface between the upper and the lower films are aligned in the relatively same direction and continuously change among the space inside the cell while, when the orientation control is weak, the liquid crystal molecules inside the cell are aligned almost uniformly whereby, at the interface of the upper and the lower films, they are aligned in relatively reverse directions. Such a state is given in FIGS. 4 and 5 in which 9 and 10 are substrates, 14 is a juncture of the chevron structure and 21 is a C director.

The polyimide orientation film of the present invention which is uniaxially oriented makes the liquid crystal molecules almost homogeneously (almost uniformly) with nearly no twisting. Moreover, when optical axis of liquid crystal is switched by a driving means, two stable states are resulted by such an almost homogeneous orientation. Because the liquid crystal molecules are scarcely twisted as such, it is now possible to make the coming-through of light little upon shielding when some methods for discriminating the switching of optical axis by optical means (e.g. polarizer) are jointly used whereby improvement in contrast characteristics is possible.

EXAMPLES

The present invention will be further illustrated by way of the examples referring to the drawings though they do not limit the scope of the present invention.

Judgment for discriminating the orientation characteristics whether it is twisted or uniform orientation was conducted as follows.

1. When an application under microscope was conducted with application of triangular wave of low frequency to the cell, inverted domain was observed. At that time, the inversion of domain by transfer of internal rotating part generated at the conjuncture (bent part) of the chevron structure (called the domain of boat form) takes place regardless of twisted and uniform orientations. Accordingly, if one or more inversion(s) of domain is/are observed in addition to the above inversion, said inversion(s) is/are that at the interface and is/are judged to be resulted via a uniform state during switching.

2. When the angle of optical axis between the two stable states during memory stage (the state where no voltage is applied) is 40% or more of the angle of transfer of the optical axis upon application of enough voltage (around ±10 volts) to the cell, that may be called uniform orientation. Incidentally, in the case of twisted orientation, that is only around 30% in most cases.

Example 1

In 98.91 g of NMP (N-methyl-2-pyrrolidone) are dissolved in ε-caprolactam 6.5 g and bis(4-aminocyclohexyl)methane 2.10 g followed by being warmed at 60° C. for ten hours. Then 1, 2, 4, 5-benzenetetracarboxylic acid dianhydride 2.08 g and 1-amino-4-trimethoxysilylbenzene 0.25 g are added thereto to provide a 10% solution of polyamide acid that can be used as an orientation film by 2 hour polymerization at 20° C. The viscosity of this polyamide acid solution was 62 cp (20° C.). By diluting the solution to 3.3% with NMP an application solution was prepared. The molar ratio of ε-caprolactam, bis(4-aminocyclohexyl)methane, 1, 2, 4, 5-benzenetetracarboxylic acid dianhydride and 1-amino-4-trimethoxysilylbenzene corresponds to 28:14:15:1.8.

Figure 1:
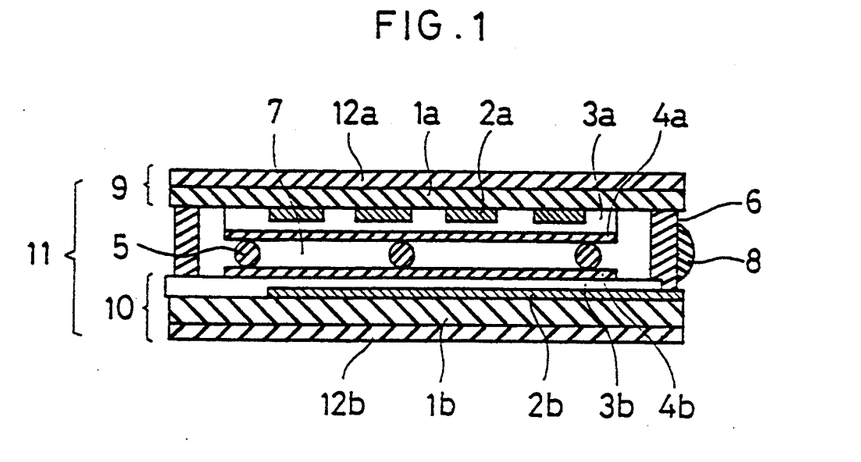
FIG. 1 is a cross section of the liquid crystal display device prepared by an embodiment of the present invention.

As shown in FIG. 1, plural transparent electrodes 2a (thickness: 300–5,000 Å or, preferably, 1,000–3,000 Å) were formed on a glass substrate 1a in stripes so that they were made parallel to each other and, upon that, protective film 3a for the electrodes of $SiO_2$ of 300–5,000 Å (preferably, 500–2,000 Å) was formed by sputtering. The above-given electrode protecting film 3a was coated with the solution by a spin coating method, preliminary baked at 100° C. for 30 minutes and baked at 220° C. for 1 hour to give polyimide film of about 400 Å thickness. Then the surface of the polyimide film was rubbed using a cloth of rayon type to conduct a uniaxial orientation whereby giving an orientation film 4a of polyimide on a substrate 9.

In the meanwhile, plural transparent electrodes 2b were formed in stripes on another glass substrate 1b under the same conditions as above so that the electrodes were made parallel to each other and, upon that, polyimide film was formed via electrode protecting film 3b under the same conditions to form a polyimide film. The surface of the polyimide film was rubbed to conduct a uniaxial orientation whereby an orientation film 4b was formed to give a substrate 10.

Then the substrates 10 and 9 were made in such a state that the orientation films 4a and 4b for each of them were opposite and the rubbing directions were made nearly the same and oriented in such a manner that the transparent electrodes 2a and 2b for each of them were crossed. Then the parts thereof except the inlet for liquid crystals were sealed using a sealing material 6 made of epoxy resin by means of a silica spacer 5 with intervals of 1.5 μm.

Then liquid crystal 7 showing chiral smectic C phase (manufactured by Chisso Petrochemical, Japan; CS-1014) in heated state were injected from the inlet by a vacuum injection method and the inlet was closed using an acryl resin 8 of a type hardened by UV to prepare a liquid crystal cell 11.

After that, polarizers 12a/12b (wherein their axes of polarization were almost crossed) were oriented on and below the cell and one of the axes of polarization of the polarizers was made almost identical with that of any one of the liquid crystals of the cell 11 to give a liquid crystal display device.

Instead of using CS-1014 of Chisso Petrochemical exhibiting chiral smectic C phase, injection was conducted using CS-1022, ZLI-3654(Merck), SLI-3689(Merck) or FELIX-002(Hoechst) to prepare liquid crystal display device and the mode of orientation was checked by experiments.

The result was that homogeneous orientation was achieved in any of the devices being injected with the above-given liquid crystals. Further, the orientation characteristics were confirmed to be uniform as a result of the above-mentioned discriminating method. Those display devices were subjected to rewritings of display using dipolar pulse of ±10 volts for 150 microseconds whereupon good bistability was resulted and, in any states, homogeneous uniform orientation was confirmed giving the display with high contrast.

Example 2

A polyamide acid solution 10% was provided in completely the same manner as Example 1 except that the molar ratio of ε-caprolactam, bis(4-aminocyclohexyl)methane, 1, 2, 4, 5-benzenetetracarboxylic acid dianhydride and 1-amino-4-trimethoxysilylbenzene was converted to 14: 14: 15: 1.8. The viscosity of this solution was 106 cP (25° C.). Liquid crystal display devices were prepared by the same operation as in Example 1. Then experiment was carried out using the liquid crystal display device thus prepared.

Homogeneous orientation was resulted in any of those devices being injected with the liquid crystals. Further, the orientation was confirmed to be uniform as a result of the above-given discriminating method. Those display devices were subjected to rewritings of display using dipolar pulse whereupon good bistability was resulted and, in any of the states, uniform orientation was confirmed giving the display with high contrast.

Example 3

A polyamide acid solution 10% was provided in completely the same manner as Example 1 except that the molar ratio of ε-caprolactam, bis(4-aminocyclohexyl)methane, 1, 2, 4, 5-benzenetetracarboxylic acid dianhydride and 1-amino-4-trimethoxysilylbenzene was converted to 42: 14: 15: 1.8. The viscosity of this solution was 32 cP (25° C.). Liquid crystal display device was prepared by the same operation as in Example 1. Then experiment was carried out using the liquid crystal display device thus prepared.

Homogeneous orientation was resulted in any of those devices being injected with the liquid crystals. Further, the orientation characteristics were confirmed to be uniform as a result of the above-given discriminating method. When those display devices were subjected to rewritings of display using dipolar pulse, good bistability was resulted and, in any of the states, uniform orientation was confirmed giving the display with high contrast.

Examples 4–8

Liquid crystal display devices were prepared by the same method as in Example 1 with exceptions that the molar ratio of ε-caprolactam, bis(4-aminocyclohexyl)methane, 1,2,4,5-benzenetetracarboxylic acid dianhydride and 1-amino-4-trimethoxysilylbenzene was changed to 8:4:5:1.8 (Example 4), 8:4:3:0.9 (Example 5), 16:8:7:1.8 (Example 6), 120:60:59:1.8 (Example 7) and 2:1:1:0 (Example 8).

The result was that homogeneous orientation was achieved in any of the devices being injected with the above-given liquid crystals. Further, the orientation characteristics were confirmed to be uniform as a result of the above-mentioned discriminating method. Those display devices were subjected to rewritings of display using dipolar pulse of ±10 volts for 150 microseconds whereupon good bistability was resulted and, in any of the states, uniform orientation was confirmed giving the display with high contrast.

Incidentally, when the cases where 1-amino-4trimethoxysilylbenzene was and was not added were compared, it was confirmed that the case with said compound resulted in easier coating of the polyamide acid solution.

Examples 9–13

Liquid crystal display devices were prepared by the same method as in Example 2 with exceptions that the molar ratio of ε-caprolactam, bis(4-aminocyclohexyl)methane, 1,2,4,5-benzenetetracarboxylic acid dianhydride and 1-amino-4-trimethoxysilylbenzene was changed to 4:4:5:1.8 (Example 9), 4:4:3:0.9 (Example 10), 8:8:7:1.8 (Example 11), 60:60:59:1.8 (Example 12) and 1:1:1:0 (Example 13).

The result was that homogeneous orientation was achieved in any of the devices being injected with the above-given liquid crystals. Further, the orientation characteristics were confirmed to be uniform as a result of the above-mentioned discriminating method. Those display devices were subjected to rewritings of display using dipolar pulse of ±10 volts for 150 microseconds whereupon good bistability was resulted and, in any of the states, uniform orientation was confirmed giving the display with high contrast.

Examples 14–18

Liquid crystal display devices were prepared by the same method as in Example 3 with exceptions that the molar ratio of ε-caprolactam, bis(4-aminocyclohexyl)methane, 1,2,4,5-benzenetetracarboxylic acid dianhydride and 1-amino-4-trimethoxysilylbenzene was changed to 12:4:5:1.8 (Example 14), 12:4:3:0.9 (Example 15), 24:8:7:1.8 (Example 16), 180:60:59:1.8 (Example 17) and 3:1:1:0 (Example 18).

The result was that homogeneous orientation was achieved in any of the devices being injected with the above-given liquid crystals. Further, the orientation characteristics were confirmed to be uniform as a result of the above-mentioned discriminating method. Those display devices were subjected to rewritings of display using dipolar pulse of ±10 volts for 150 microseconds whereupon good bistability was resulted and, in any of the states, uniform orientation was confirmed giving the display with high contrast.

Comparative Example 1

The same operation as in Example 1 was conducted with an exception that the orientation was changed to PVA to prepare liquid crystal display devices.

Homogeneous orientation was resulted in all of the devices being injected with any liquid crystal with chiral smectic C phase. However, uniform orientation was not resulted but twisted orientation was observed. When display rewriting was carried out in those display devices using dipolar pulse, good bistability was achieved but, in both states, twisted orientation was resulted and high contrast was not obtained.

Comparative Example 2

The same operation as in Example 1 was conducted with an exception that the orientation film was changed to nylon (Nylon 6/6 manufactured by Toray) to prepare liquid crystal display devices.

In all of the liquid crystal display devices prepared as comparative examples, there were many defects in orientation and the property was low especially in terms of contrast and homogenicity.

Comparative Example 3

The same operation as in Example 1 was conducted with an exception that the orientation film was changed to PSI-A-2001 (polyimide; manufactured by Chisso) to prepare liquid crystal display devices.

Though homogeneous orientation was resulted in all of the liquid crystal display devices prepared, uniform orientation was not achieved but twisted orientation was observed. When those display devices were subjected to display rewriting using dipolar pulse, good bistability was achieved but, in both states, the twisted orientation was obtained and high contrast was not achieved.

Comparative Example 4

The same operation as in Example 1 was conducted with an exception that the orientation film was changed to PSI-A-X009 (polyimide; manufactured by Chisso) to prepare liquid crystal display devices.

Though homogeneous orientation was resulted in all of the liquid crystal display devices prepared, uniform orientation was not achieved but twisted orientation was observed. When those display devices were subjected to display rewriting using dipolar pulse, good bistability was achieved but, in both states, the twisted orientation was obtained and high contrast was not achieved.

Comparative Example 5

The same operation as in Example 1 was conducted with an exception that the orientation film was changed to PSI-A-2301 (polyimide resin; manufactured by Chisso Petrochemical, Japan) to prepare liquid crystal display devices.

However, in all of the devices, there were many defects in orientation and their properties were low especially in terms of contrast and homogenicity.

Comparative Example 6

The same operation as in Example 1 was conducted with an exception that the orientation film was changed to SE-7311 (polyimide resin; manufactured by Nissan Chemical, Japan) to prepare liquid crystal display devices.

Though homogeneous orientation was resulted in all of the liquid crystal display devices prepared, uniform orientation was not achieved but twisted orientation was observed. When those display devices were subjected to display rewriting using dipolar pulse, good bistability was achieved but, in both states, the twisted orientation was obtained and high contrast was not achieved.

Comparative Example 7

The same operation as in Example 1 was conducted with an exception that the orientation film was changed to SE-610 (polyimide resin; manufactured by Nissan Chemical) to prepare liquid crystal display devices.

Though homogeneous orientation was resulted in all of the liquid crystal display devices prepared, uniform orientation was not achieved but twisted orientation was observed. When those display devices were subjected to display rewriting using dipolar pulse, good bistability was achieved but, in both states, the twisted orientation was obtained and high contrast was not achieved.

Comparative Example 8

The same operation as in Example 1 was conducted with an exception that the orientation film was changed to RN-747 (polyimide; manufactured by Nissan Chemical) to prepare liquid crystal display devices.

Though homogeneous orientation was resulted in all of the liquid crystal display devices prepared, uniform orientation was not achieved but twisted orientation was observed. When those display devices were subjected to display rewriting using dipolar pulse, good bistability was achieved but, in both states, the twisted orientation was obtained and high contrast was not achieved.

Comparative Example 9

The same operation as in Example 1 was conducted with an exception that the orientation film was changed to RN-776 (polyimide; manufactured by Nissan Chemical) to prepare liquid crystal display devices.

Though homogeneous orientation was resulted in all of the liquid crystal display devices prepared, uniform orientation was not achieved but twisted orientation was observed. When those display devices were subjected to display rewriting using dipolar pulse, good bistability was achieved but, in both states, the twisted orientation was obtained and high contrast was not achieved.

In accordance with the present invention, it is possible to offer liquid crystal display device wherein, in spite of its chevron structure, bistable switching can be conducted because of uniform orientation and high contrast characteristics (40 or more) can be resulted.

What is claimed is:

1. A ferroelectric liquid crystals display device comprising a pair of substrates arranged to form a cell; ferroelectric liquid crystals disposed in the cell; one or more electrodes disposed on each substrate interior to the cell; an orientation film comprising a polyimide resin obtained by polymerization of an amine of the formula (I)

(I)

wherein n and m each is an integer of 0 to 2 provided that (n+m) should be an integer of 1 to 4, with 1, 2, 4, 5-benzenetetracarboxylic dianhydride as main components, the orientation film being (i) disposed on one or more electrodes, (ii) in contact with the ferroelectric liquid crystals, and (iii) having a uniaxial orientation.

2. The device of claim 1 wherein the amine of the formula (I) is one having both n and m being 1.

3. The device of claim 1 wherein the amine of the formula (I) is one having n being 1 and m being 0.

4. The device of claim 1 wherein the amine of the formula (I) is one having n being 1 and m being 2.

5. The device of claim 1 wherein the polyimide resin further comprises 1-amino-4-trimethoxysilylbenzene.

6. The device of claim 1 wherein the uniaxial orientation is conducted by a rubbing method.

7. A ferroelectric liquid crystals display device in accordance with claim 1, wherein at least one electrode is provided with a protecting or insulating film on the surface thereof.

* * * * *